Nov. 20, 1928.
J. K. DARBY
1,692,114
ELECTRIC MOTOR WINDING MACHINE
Filed Dec. 15, 1926   5 Sheets-Sheet 1
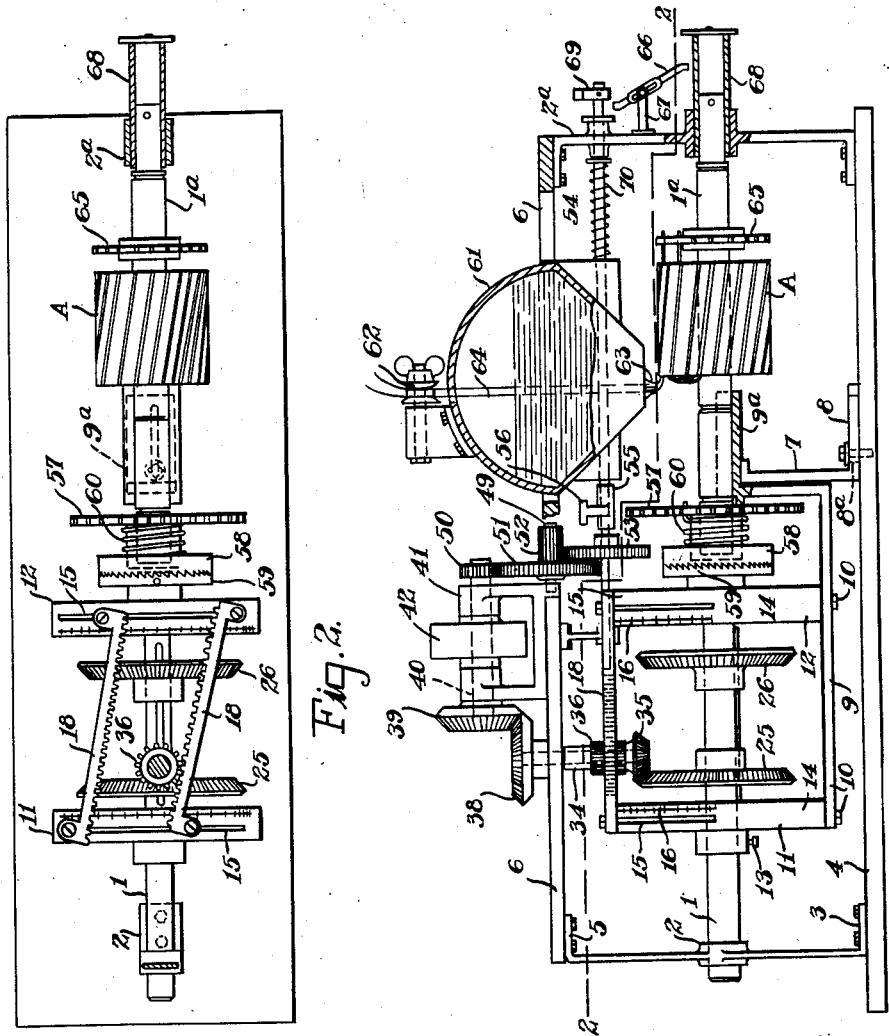
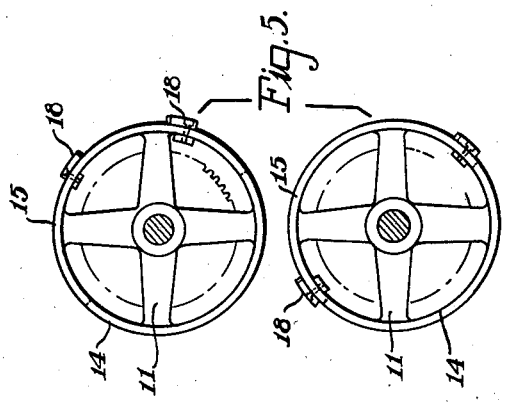

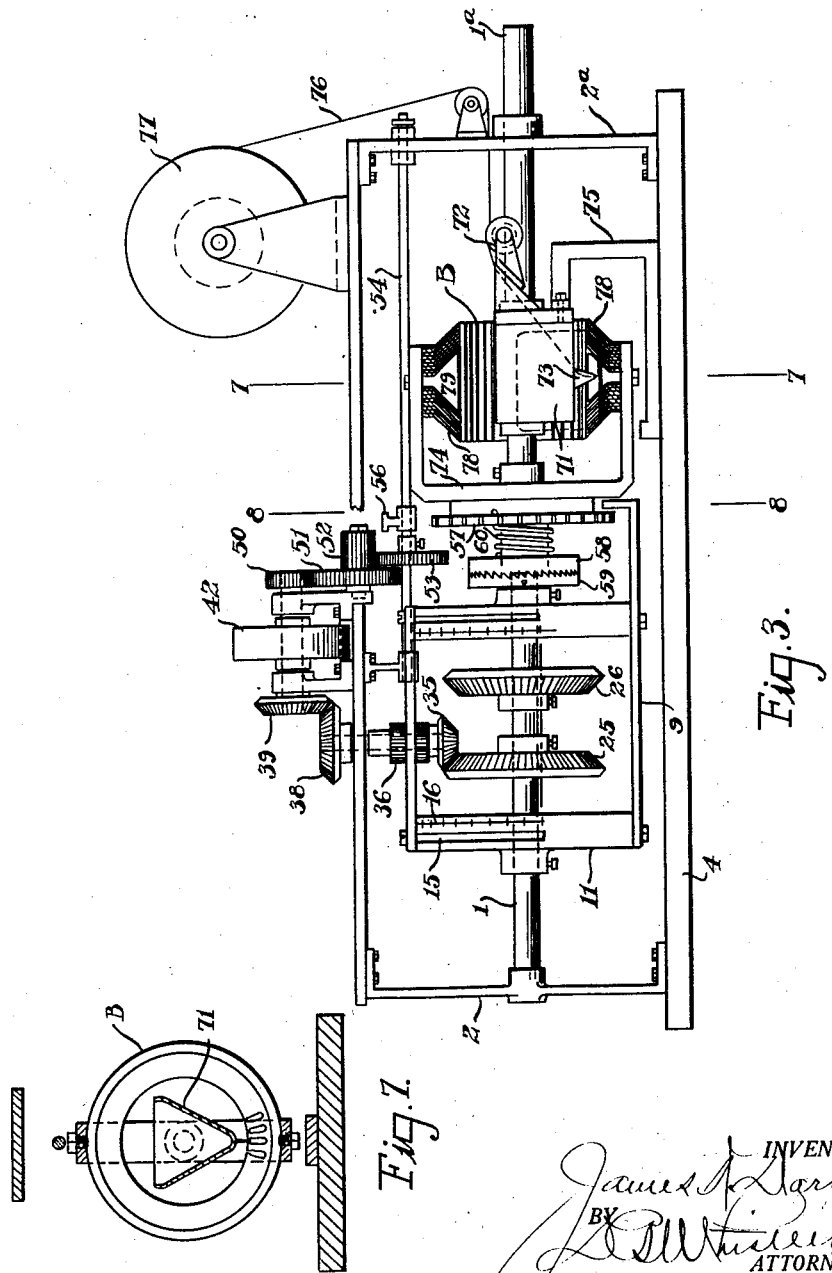

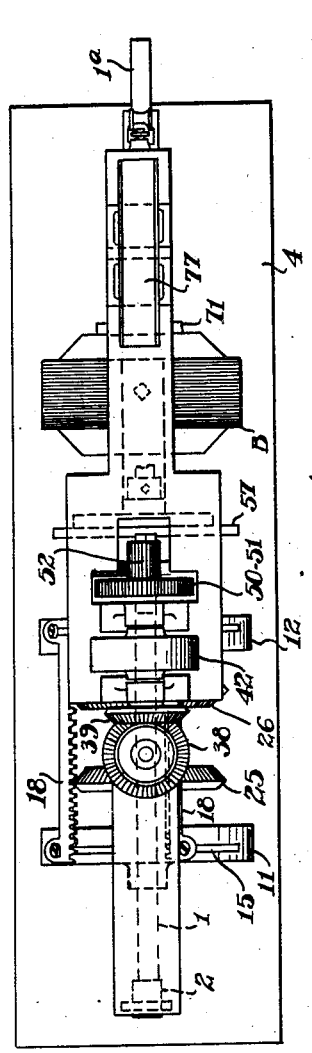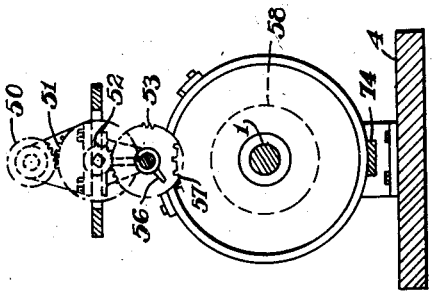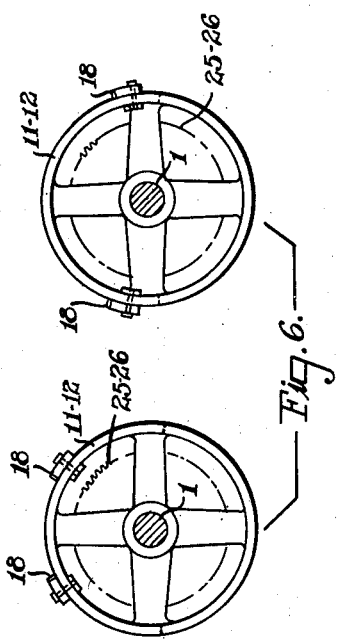

Nov. 20, 1928.  1,692,114
J. K. DARBY
ELECTRIC MOTOR WINDING MACHINE
Filed Dec. 15, 1926   5 Sheets-Sheet 4

INVENTOR.
James K. Darby
BY
ATTORNEY.

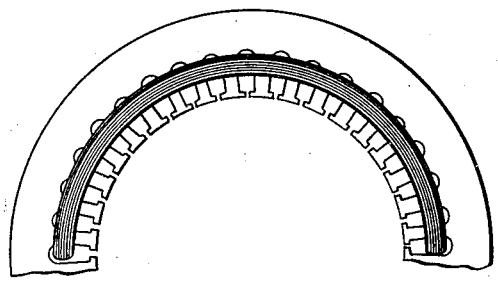
Fig.16.
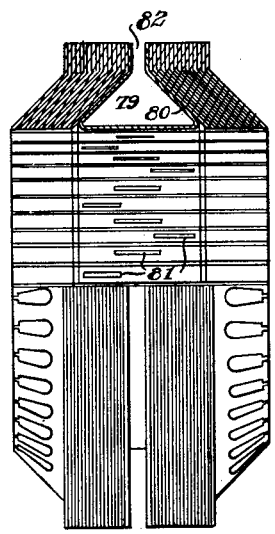
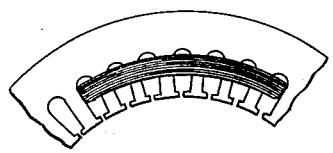
Fig.15.
Fig.17.
Fig.18.
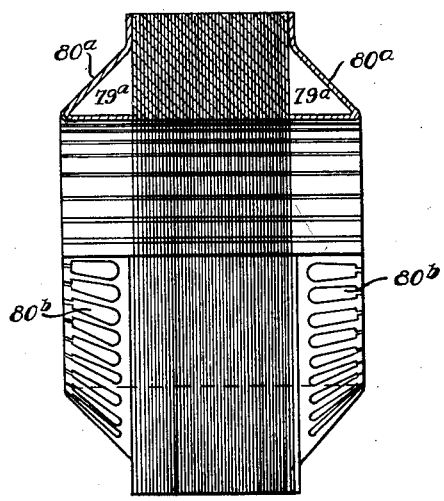
Fig.14.

Patented Nov. 20, 1928.

1,692,114

UNITED STATES PATENT OFFICE.

JAMES K. DARBY, OF DAYTON, OHIO, ASSIGNOR OF ONE-THIRD TO LAWRENCE C. STOLTZ, OF DAYTON, OHIO.

ELECTRIC MOTOR-WINDING MACHINE.

Application filed December 15, 1926. Serial No. 155,038.

This invention relates to improvements in electric motor and armature winding apparatus.

In the accompanying drawings which serve to illustrate the invention:

Fig. 1 is a view in side elevation, partly in section, of the motor winder;

Fig. 2 is a sectional view taken on line 2—2 of Fig. 1;

Fig. 3 is a view in side elevation similar to Fig. 1, illustrating a modification;

Fig. 4 is a plan view of Fig. 3;

Fig. 5 is a view in end elevation illustrating different adjustments of the winder, as shown in Figs. 1–2;

Fig. 6 is a view in end elevation illustrating different adjustments of the winder as shown in Figs. 3–4;

Fig. 7 is a view in cross section on line 7—7 of Fig. 3;

Fig. 8 is a sectional view on line 8—8 of Fig. 3;

Fig. 14 is a view partly in section of the fields in one form;

Figs. 15–16 are detail views of Fig. 14;

Fig. 17 is a view partly in section showing a modification of the magnetic fields;

Fig. 18 is a detail view of Figs. 14–17.

Figure 10:
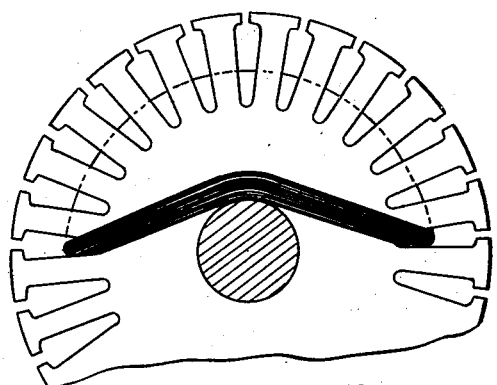
Figs. 10–11 are detail views of Fig. 9 showing modifications of windings.

The objects attained in the invention consist in motor construction adapted for accurate winding by the winding apparatus herein shown, thus to improve the construction and operation of the motor and reduce the cost of production.

A feature of the improved winding of the motor consists in novel means for insulating the wire incident to winding the motor.

A further feature of the invention consists in a novel arrangement of the stator and rotor of the motor to effect machine winding of the same.

The objects attained in the winding apparatus consist in a machine adapted for winding both the armature and the magnetic fields, which is more automatic than winding machines used in the common practice, which will effect a more uniform winding of the motor and produce a larger output, thus tending to lower manufacturing costs.

As illustrated in the main assembly views Figs. 1–4, the motor winding apparatus consists of a shaft 1 adapted to be supported in any suitable frame structure comprising, as here shown, an end bearing bracket 2 secured to a base member 4 as indicated at 3 and to a top plate or table 6 as indicated at 5. A bracket 7 secured to base 4, as indicated at 8, serves for supporting the mechanism at an intermediate point, the bracket being adjustable longitudinally of the plate by means of a slot $8^a$ in the base of the bracket to adapt the frame to variations in construction.

The detail arrangement of the winding machine is best shown in Fig. 1 wherein a standard armature —A is shown chucked on a shaft $1^a$ in the machine, the armature slots being at an angle to the axis of rotation.

Supported rotatably relative to shafts 1—$1^a$ on brackets 7 is a member 9, the end $9^a$ of which serves as a slide bearing for shaft $1^a$. Supporting part 9 as indicated at 10, are opposite brackets or spiders 11—12 secured to shaft 1 by set screws 13. The brackets 11—12 are each provided with a peripheral flange 14, the same being slotted circumferentially half way around, as indicated at 15, an indicator 16 being arranged along each slot. Two parallel racks 18 span the space between spiders 11—12, the opposite ends of the racks being connected with slots 16 to permit of adjusting the racks in the slots to effect variable spacing between the racks, and angular relation of the racks to agree with the angle of the slots in the armature, the indicators 16 serving as an aid for aligning the parallels upon making adjustments thereof.

Mounted on shaft 1 between parts 11—12, are opposite bevel gears 25—26, the gears being movable axially of the shaft to effect variable adjustments of the mechanism. The gears are in operative relation, alternately one with the other, with a bevel gear 35 on the end of a shaft 34 which has a spur gear 36 secured to its intermediate portion which is in mesh alternately with the opposite racks 18 as the winding mechanism is actuated back and forth rotatably by the action of the gears 35, 25—26.

Shaft 34 is supported in a bearing in part 6 and has secured to its opposite end a bevel gear 38 in operative relation with a bevel gear 39 on a shaft 40 supported in a bracket 41 on part 6, the shaft being driven by a pulley 42 by any suitable connection with a source of power.

A spur gear 50 secured to the opposite end of shaft 40 meshes with a gear 51 on a jack shaft 49, an elongated reduction gear 52 being secured to gear 51 in sliding relation with a gear 53 on a shaft 54 supported in a bracket 55 of part 6. Any suitable gear ratios may be effected by substituting different gears in the gear train 50—53 according to the motor winding that is to be effected. A segmental gear 56 is secured to shaft 54 which acts to transmit intermittent movement to a gear 57 on shaft 1ª. Clutch members 58—59 are secured to the abutting ends of shafts 1—1ª, part 58 being slidable axially on the hub of gear 57, the same being spring tensioned toward part 59 by a spring 60, to permit of step by step movement of the armature supporting shaft 1ª independent of shaft 1. Thus when the ratio of gears 50—53 has been adjusted to determine the number of coils in each section or group winding of the stator or rotor, as the case may be, gear 55 will act to rotate shaft 1ª the required extent for moving another sector into position for winding.

Secured to rod 54 is a container 61 for a wire insulating liquid, the container being provided with a wire guide and tensioning device 62 and a finger or needle 63 for threading the wire 64 into the slots of the rotor —A, as shown in Fig. 1.

The container 61 is supported to move axially with shaft 54 to provide the required movement for looping the wire at the right end of the coils, as viewed in Fig. 2, on a part 65 which serves for supporting the coils temporarily until the winding is completed when the wire is disengaged and is connected in the usual manner with the commutator.

Movement is imparted to the container and wire threading device 61—63 by a lever 66 pivoted on a bracket 67, the lower free end of the lever being in position to be engaged by the end of a sleeve 68 secured to shaft 1ª, and thus to be reciprocated upon each axial movement of the shaft. The upper end of the lever acts by engaging a lug 69 on shaft 54 to move the wire threading device secured to the shaft, the required distance for looping the wire on part 65, a spring 70 coiled on shaft 54 between part 61 and the end bracket 2ª acting to move the parts in the opposite direction.

Gear 52 is elongated to permit of gear 53 moving with shaft 54 without the gears 52—53 passing out of mesh one with the other. The segmental gear 56 also moves axially with shaft 54, the gearing shown and described in connection with Fig. 1 being timed to cause gear 56 to actuate gear 57 and shaft 1ª in the sequence required for the relative movements of the winder 61 and rotor A, for effecting winding of the rotor.

The winding apparatus as shown in Figs. 3–4 shows the adaptation of the same for winding the field or stator. The modifications consist of a container 71 for the insulating liquid of a suitable shape and size, as best shown in Fig. 7, for adapting the same to be disposed inside the stator —B as the same is moved axially with shafts 1—1ª to effect the windings, the threading device being provided with a wire guide and tensioner 72 and a finger 73 for directing the wire into the slots. The stator is supported on a bracket 74 secured to shaft 1ª and thus moves axially and rotatably with the shaft, the wire threading device being supported in stationary relation on a bracket 75, the wire 76 being supplied from a spool 77.

The showing of the stator —B in Fig. 3 is a vertical sectional view. To make the machine winding more effective the lamina 78 of the opposite sides of the magnetic fields are flared outward axially, as best shown in Fig. 17, in opposite directions from the center of the rotor, the inclination of the slotted portions, or the lamina fingers, acting to direct the wire as it passes through the finger 73 to the bottom of the slots, the tension on the wire aiding in effecting a compact and symmetrical winding.

This novel arrangement of the stator lamina results in forming an annular space or air gap 79, between the opposite half sections, around the inner periphery of the stator. An annular channel member 80 is arranged in the space 79 to close the gap.

Figure 11:
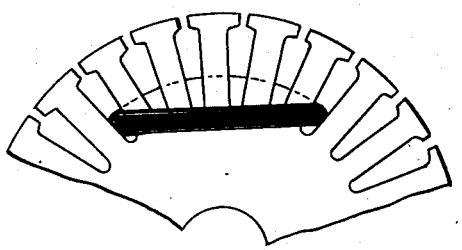
Figure 12:
Figs. 12–13 are further detail views of Fig. 9.
Figure 13:
Figure 9:
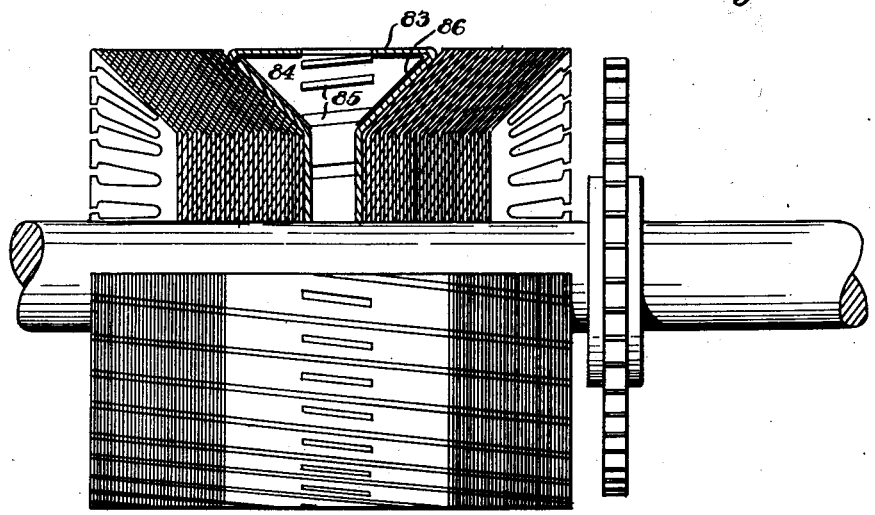
Fig. 9 is a detail view, partly in section of the armature in one form.

Figs. 10, 11, and 12 are detail figures serving to illustrate usual rotor windings except that the lamina are to be understood to be inclined as illustrated in Fig. 9.

Having described my invention, I claim:

1. An apparatus of the character described including in combination, a container for liquid insulating material, means for moving part of an electric motor, axially and rotatably relative to said container, means for directing the wire of the motor through said liquid, and means for effecting winding of said part with said wire incident to said movements thereof.

2. An apparatus of the character described including in combination, a container for liquid insulating material, means for moving part of an electric motor, axially and rotatably relative to said container, means for also moving the container relative to said part, means for directing the wire for the motor through said liquid, and means for effecting winding of said part with said wire incident to said movements thereof.

3. An apparatus of the character described including in combination, a container for liquid insulating material, means for imparting axial and primary and secondary movements to part of an electric motor, relative to said container, means for directing the wire for the motor through said liquid, and means for effecting winding of said part with said wire incident to said movements thereof.

4. An apparatus of the character described including in combination, a container for liquid insulating material, means for imparting axial and primary and secondary movements to part of an electric motor, relative to said container and for moving the container intermittently, means for directing the wire for the motor through said liquid, and means for effecting winding of said part with said wire incident to said movements thereof.

5. Winding apparatus for electric motors consisting in the combination of a shaft for supporting part of the motor, opposite racks extending parallel to the slots in said part for receiving the wire, connections with said racks and shaft for imparting axial and rotary movements to said part, and means for effecting winding of said part incident to said movements thereof.

6. Winding apparatus for electric motors consisting in the combination of a shaft for supporting part of the motor, opposite gears on said shaft and opposite racks fixed relative to the shaft parallel to the wire slots in said part, an actuator coacting with said gears and racks for imparting intermittent axial rotary movements through the shaft to said part, and means for effecting winding of said part incident to said movements thereof.

7. Winding apparatus for electric motors consisting in the combination of a shaft for supporting part of the motor, opposite gears on said shaft and opposite racks fixed relative to the shaft parallel to the wire slots in said part, an actuator coacting with said gears and racks for imparting intermittent axial and rotary movements through the shaft to said part, means for varying the space between the gears on said shaft for effecting the extent of the axial movement of said part, and means for effecting winding of said part incident to said movements thereof.

8. Winding apparatus for electric motors consisting in the combination of a shaft for supporting part of the motor, opposite gears on said shaft and opposite racks fixed relative to the shaft parallel to the wire slots in said part, and actuator coacting with said gears and racks for imparting intermittent axial and rotary movements through the shaft to said part, means for varying the space between the gears on said shaft for effecting the extent of the axial movement of said part, and means for effecting winding of said part incident to said movements thereof.

9. Winding apparatus for electric motors consisting in the combination of a shaft for supporting part of the motor, opposite gears spaced one from another on said shaft, opposite racks extending parallel to the slots in said part for receiving the wire and supported on brackets secured to the shaft, a gear disposed between and operable intermittently with the respective racks for reciprocating said shaft axially, and a gear disposed between and operable intermittently with the respective spaced gears for reciprocating the shaft rotatably and means for effecting winding of said part incident to said movements thereof.

10. Winding apparatus for electric motors consisting in the combination of a shaft for supporting part of the motor, opposite gears spaced one from another on said shaft, opposite racks extending parallel to the slots in said part for receiving the wire and supported on brackets secured to the shaft, a gear disposed between and operable intermittently with the respective racks for reciprocating said shaft axially, and a gear disposed between said spaced gears and operable intermittently with said gears for reciprocating the shaft rotatably and for moving the racks alternately into operative relation with the rack actuating gear and means for effecting winding of said part incident to said movements thereof.

11. Winding apparatus for electric motors consisting in the combination of a shaft for supporting part of the motor, opposite gears spaced one from another on said shaft, opposite racks extending parallel to the slots in said part for receiving the wire and supported on brackets secured to the shaft, a gear disposed between and operable intermittently with the respective racks for reciprocating said shaft axially, a gear disposed between said spaced gears in fixed relation with the rack actuating gear and operable intermittently with said gears for reciprocating the shaft rotatably and for moving the racks alternately into operative relation with said rack actuating gear, and means for effecting winding of said part incident to the said movements thereof.

12. Winding apparatus for electric motors consisting in the combination of a shaft for supporting part of the motor, opposite gears spaced one from the other on said shaft, brackets secured to the shaft outwardly of the gear, slots in the brackets extending circumferentially of the shaft, opposite racks adjustable in said slots for variably spacing the racks one relative to another and parallel to the slots for the wire in said part, connections with said racks and shaft for moving said part axially and rotatably, and means for effecting winding of said part incident to said movements thereof.

13. Winding apparatus for an electric motor including in combination, an axially aligned sectional shaft operable axially, and rotatably in one direction, as a single shaft and rotatably independently one section of another in the opposite direction, one section serving to support part of the motor, and another section serving for imparting axial and rotatable movements to said supporting shaft for effecting the winding operations.

14. Winding apparatus for an electric motor including in combination, an axially aligned sectional shaft, a clutch connected between sections, and operable axially, and rotatably in one direction, as a single shaft and rotatably independently one section of another in the opposite direction, one section serving to support part of the motor and another section serving for imparting axial and rotatable movements to said supporting shaft for effecting the winding operations.

15. Winding apparatus for electric motors consisting in the combination of a divided shaft for supporting a part of a motor, on a portion thereof, means for operating said shaft and said part supported thereon axially as a whole, and means operatively timed with the shaft for operating said portion thereof and said motor part rotatably intermittently independently of the other portion of the shaft, and means for effecting winding of said part of the motor incidental to said movements of the shaft.

16. Winding apparatus for electric motors consisting in the combination of a divided shaft for supporting a part of a motor, on a portion thereof, means for operating said shaft and said part supported thereon axially as a whole, and a gear train consisting of reduction and segmental gearing and a driving connection between the divided portions of the shaft for operating said first named portion thereof rotatably independently of the other portion of the shaft, and means for effecting winding of said part of the motor incidental to said movements of the shaft.

17. Winding apparatus for an electric motor including a container for liquid insulating material operable in the aperture of the stator of a motor and means for effecting relative movement between the stator and the liquid container and for directing the wire through said liquid into the coil slots.

In testimony whereof, I affix my signature.

JAMES K. DARBY.